Nov. 30, 1965 T. G. CARTER, JR 3,220,522
POSITIVE CLUTCH

Filed Feb. 14, 1964 2 Sheets-Sheet 1

THOMAS G. CARTER, JR.
INVENTOR.

BY
Atty.

Nov. 30, 1965  T. G. CARTER, JR  3,220,522
POSITIVE CLUTCH

Filed Feb. 14, 1964  2 Sheets-Sheet 2

THOMAS G. CARTER, JR.
INVENTOR.

BY

United States Patent Office 3,220,522
Patented Nov. 30, 1965

3,220,522
POSITIVE CLUTCH
Thomas G. Carter, Jr., 2611 2nd St., Lubbock, Tex.
Filed Feb. 14, 1964, Ser. No. 345,041
4 Claims. (Cl. 192—67)

This invention relates to motor gear boxes and more particularly to gearing including a helical splined shaft telescoped within a clutch sleeve.

In the gear boxes of motor vehicles which are manually operated, it is common for the drive to include a clutch sleeve telescoped over a splined shaft. Many of these include a helically splined shaft. In such an instance, the helical splines tend to produce an axial thrust which tends to move the sleeve from the splined shaft. This thrust is balanced by other means. However, in certain designs there has been a problem presented that the counter balancing thrust is not sufficient to prevent movement of the sleeve. The sleeve slips from the splined shaft permitting the drive to "jump out of gear."

I have remedied this situation by cutting flutes upon the side of each of the helical splines of the shaft and a peripheral groove in the internal splines of the clutch sleeve so that when the elements are meshed in driving position, the force is transmitted from a flute on the spline against the shoulder of the groove.

An object of this invention is to provide a helically splined shaft-sleeve gear transmission which will not accidentally disengage.

Another object is to achieve this by modification of standard elements now in common use.

Further objects of this invention are to achieve the above with a device that is sturdy, compact, durable, simple, and reliable, yet inexpensive and easy to manufacture and operate.

Still further objects are to achieve the above with a method that is rapid, inexpensive, and easy for inexperienced, unskilled people to perform.

The specific nature of the invention as well as other objects, uses, and advantages thereof will clearly appear from the following description and from the accompanying drawing, the different views of which are not necessarily to the same scale, in which.

Figure 2:
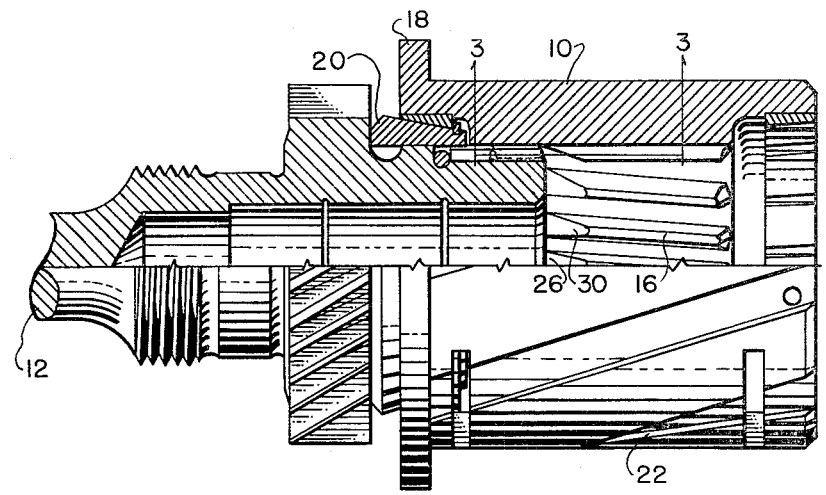
FIG. 2 is a partial axial sectional view of the particular elements involved in this invention.
Figure 3:
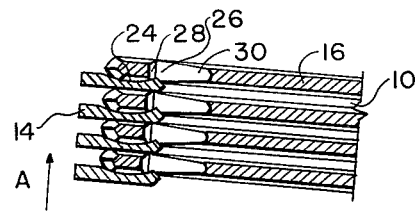
FIG. 3 is a sectional view of the splines in meshed position taken on line 3—3 of FIG. 2.

Referring particularly to the drawings, clutch sleeve 10 is telescoped over splined input shaft 12. The power is transmitted into the gears through the input shaft 12. The input shaft 12 has external helical splines 14 on one end thereof. In the position shown in FIGS. 2 and 3, these external helical splines 14 are meshed with correlative internal helical splines 16 of the clutch sleeve 10. The clutch sleeve 10 is movable axially and is provided with collar 18 by which it may be moved by mechanism not shown. A synchronizing ring or lug 20 is mounted within each end of the clutch sleeve 10 for synchronizing the elements as well known to the art. The clutch sleeve has external teeth 22 on the outside of it for transmitting the power to other elements not shown. The mechanism as described to this point is conventional and commercially available on the market in motor vehicles.

Figure 1:
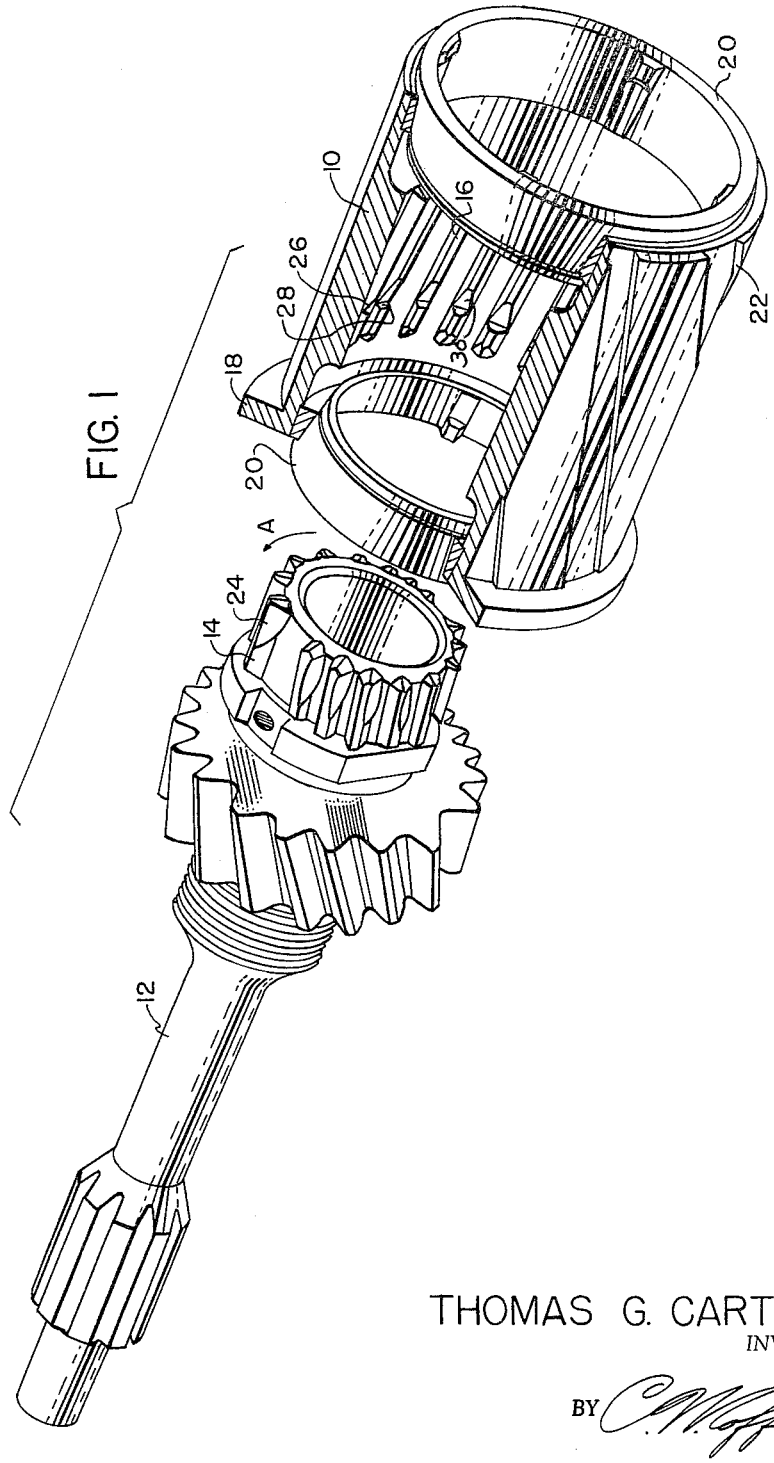
FIG. 1 is an exploded perspective view with parts broken away showing the principal elements of this invention.

The helical angle on the external helical splines 14 and internal helical splines 16 is such that it tends to push the clutch sleeve 10 away from the input shaft 12. The input shaft 12 rotates in the direction of arrow A in FIGS. 1 and 3. The reason for these helical angles are well understood to those skilled in the art. This axial thrust is countered by other forces.

I have found it desirable to reduce this axial force by cutting concave fluted indentations 24 on one side of each of the external helical splines 14. By flutes, I mean cuts, notches, or indentations, a portion of which are straight, i.e., a portion of the flutes 24 are parallel to the axis of the input shaft 12. In practice, the flutes 24 are cut by advancing the peripheral face of a rotating beveled grinding wheel toward the axis of the input shaft 12. The edge of the peripheral face forms the side of the flute 24 so that after the cut is completed, the beveled radial face of the grinding wheel is against the flute 24. The flutes 24 are the full height of the external helical splines 14.

In addition to this, I cut a peripheral groove 26 in all of the internal helical splines 16. This cut is likewise made with a grinding wheel. It is made so that the shoulder 28 of the groove 26 is normal to the axis of the clutch sleeve 10. The other shoulder 30 is tapered or angled relative to the axis of the clutch sleeve 10. The shoulder 28 normal to the axis is on that side of the groove 26 toward the input shaft 12. The peripheral groove 26 cuts to the full depth of the internal helical splines 16.

Therefore, in operation, the force is transmitted by pressure of the flutes 24 against an edge of the shoulder 28 of the groove 26. As may be seen, particularly in FIG. 3, there is no resulting axial thrust from this arrangement.

It will be apparent that the embodiment shown is only exemplary and that various modifications can be made in construction, materials, and arrangement within the scope of the invention as defined in the appended claims.

I claim as my invention:

1. A motor gear box comprising in combination:
   (a) an input shaft,
   (b) external helical splines on said input shaft,
   (c) a clutch sleeve,
   (d) internal helical splines on said clutch sleeve correlative to the splines on the input shaft,
   (e) the clutch sleeve axially movable,
   (f) a collar on the clutch sleeve to axially move the clutch sleeve to telescope it over the shaft to mesh the splines of the clutch sleeve with the splines of the input shaft,
   (g) flutes indented the full height of each of the external splines of the input shaft,
   (h) a peripheral groove extending around the circumference of all the internal splines of the clutch sleeve,
   (i) the peripheral groove cut the full depth of the internal splines;
   (j) the flutes driving against a shoulder of the groove when the splines are meshed.

2. In a motor gear box having
   (a) an input shaft,
   (b) external helical splines on said input shaft,
   (c) a clutch sleeve,
   (d) internal helical splines on said clutch sleeve correlative to the splines on the input shaft,
   (e) the clutch sleeve axially movable to telescope the sleeve over the shaft to mesh the splines of the clutch sleeve with the splines on the input shaft, and
   (f) external teeth on the exterior of the clutch sleeve; the improvement comprising in combination:
   (g) flutes indented in one side of each of the external splines of the input shaft,
   (h) a portion of said flutes parallel to the axis of the shaft, and
   (i) a peripheral groove cut in all the internal splines of the clutch sleeve;
   (j) the parallel portion of the flutes driving against a shoulder of the groove when the splines are meshed, and
   (k) a portion of the flutes extending within the groove past the shoulder.

3. The invention as defined in claim 2 wherein
(k) the peripheral groove cuts the full depth of the internal splines, and
(m) the peripheral groove forms a shoulder normal to the axis of the clutch sleeve on the side of the groove toward the input shaft, and
(n) the peripheral groove forms a tapered shoulder on the side of the groove away from the input shaft.

4. The invention as defined in claim 2 wherein
(k) the flutes are indented the full height of the external splines.

References Cited by the Examiner

UNITED STATES PATENTS

| | | |
|---|---|---|
| 1,935,965 | 11/1933 | Wahlberg. |
| 2,846,038 | 8/1958 | Brownyer _____ 192—114 |

FOREIGN PATENTS

| | | |
|---|---|---|
| 744,949 | 1/1944 | Germany. |
| 760,776 | 11/1956 | Great Britain. |

DAVID J. WILLIAMOWSKY, *Primary Examiner.*